United States Patent [19]

Sato et al.

[11] 4,401,380

[45] Aug. 30, 1983

[54] BLADE FOR FOCAL PLANE SHUTTER

[75] Inventors: Akihiko Sato; Yoshiyuki Nakano; Etsuo Tanaka, all of Tokyo, Japan

[73] Assignee: Nippon Kogaku K.K., Tokyo, Japan

[21] Appl. No.: 347,281

[22] Filed: Feb. 9, 1982

Related U.S. Application Data

[63] Continuation of Ser. No. 955,194, Oct. 27, 1978, abandoned.

[30] Foreign Application Priority Data

Oct. 31, 1977 [JP] Japan ............................... 52-129672
May 26, 1978 [JP] Japan ............................... 53-70456

[51] Int. Cl.³ .......................... G03B 9/40; G03B 9/36
[52] U.S. Cl. ................................... 354/246; 354/245
[58] Field of Search ............... 354/226, 230, 241–250, 354/261

[56] References Cited

U.S. PATENT DOCUMENTS

| | | | |
|---|---|---|---|
| 2,077,500 | 4/1937 | Townsend et al. | 345/245 X |
| 2,670,667 | 3/1954 | Aiken | 354/246 |
| 3,685,423 | 8/1972 | Dahlgren | 345/241 |
| 3,984,853 | 10/1976 | Bott et al. | 354/246 |

FOREIGN PATENT DOCUMENTS

| | | | |
|---|---|---|---|
| 1828597 | 3/1961 | Fed. Rep. of Germany | 354/250 |
| 474510 | 11/1937 | United Kingdom | 354/250 |

*Primary Examiner*—Thomas H. Tarcza
*Attorney, Agent, or Firm*—Shapiro and Shapiro

[57] ABSTRACT

A shutter blade for focal plane shutter, in which the blade thickness is made the thinnest possible by forming a plurality of recesses throughout the whole area, except for the connecting part of the blade with a drive mechanism and the outer peripheral edge of the blade. The recesses are in the regular polygonal shape such as hexagon, square, triangle, and so forth.

14 Claims, 13 Drawing Figures

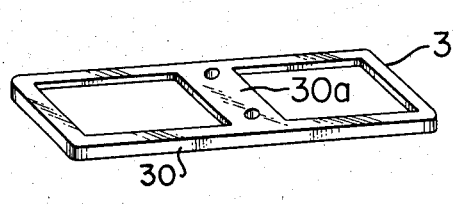
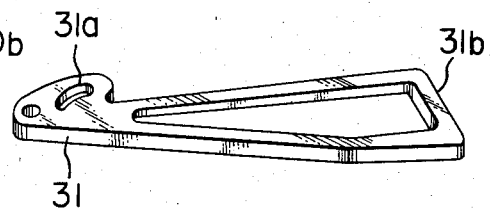
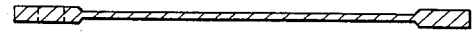
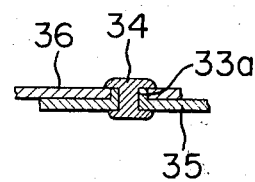
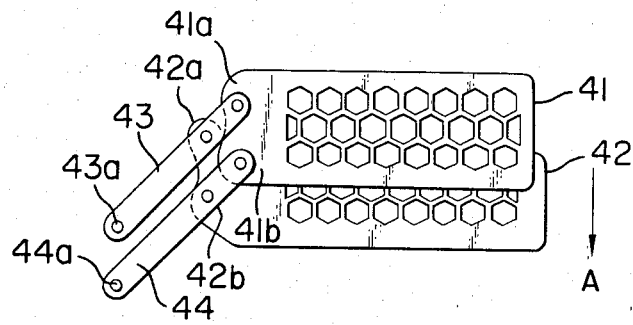

BLADE FOR FOCAL PLANE SHUTTER

This application is a continuation of Ser. No. 955,194, filed Oct. 27, 1978, now abandoned.

BACKGROUND OF THE INVENTION

This invention relates to a square focal plane shutter, in which front and rear blade groups, each consisting of a plurality of shutter blades, are formed with a metal material. More particularly, the invention is concerned with a structure of each shutter blade constituting the focal plane shutter.

In the focal plane shutter manufactured by conventional techniques, the plate material for the shutter blade has been fairly thick at its pivotal connection, with an operating arm or at its cam groove so as to sufficiently withstand the driving force from a drive mechanism. The plate thickness is uniform throughout the shutter blade, causing the inertia of the shutter blade to be large. As a consequence, there is a disadvantages in that: shock at the termination of the shutter blade movement and load at the time of the shutter charging operation (an operation to accumulate driving force in the shutter drive mechanism) are large.

SUMMARY OF THE INVENTION

It is therefore an object of the present invention to provide an improved shutter blade for the focal plane shutter free from the abovementioned disadvantages, wherein the thickness of the material plate is made the thinnest possible, except for the surrounding area of the connecting part where the blade is connected with the drive mechanism, and those portions where close contact is required with the adjacent shutter blade components to prevent leakage of light, i.e., the outer peripheral edge of the blade.

It is another object of the present invention to provide a shutter blade for the focal plane shutter, wherein thickness of the plate material for the shutter blade is made thin to reduce its weight without lowering its mechanical strength.

The foregoing objects, other objects and the construction and resulting effect to be derived from the shutter blade for the focal plane shutter according to the present invention will become more apparent and understandable from the following detailed description thereof, when read in conjunction with the accompanying drawings.

BRIEF DESCRIPTION OF THE DRAWING

In the drawings;

FIG. 3a is a perspective view showing a first embodiment of the shutter blade according to the present invention;

FIG. 3b is also a perspective view showing a second embodiment of the shutter blade according to the present invention;

FIGS. 4a and 4b are, respectively longitudinal cross-sections of the shutter blades, wherein FIG. 4a shows that the blade is made thin only on one surface side, and FIG. 4b shows that it is made thin on both surface sides;

FIG. 5 is a partial side view in longitudinal cross-section showing a third embodiment of the shutter blade according to the present invention;

FIG. 6 is a front view showing a focal plane shutter constructed with a fourth embodiment of the shutter blade according to the present invention;

DETAILED DESCRIPTION OF THE INVENTION

At the outset, the focal plane shutter by the known techniques will be described in reference in FIGS. 1 and 2.

Figure 1:
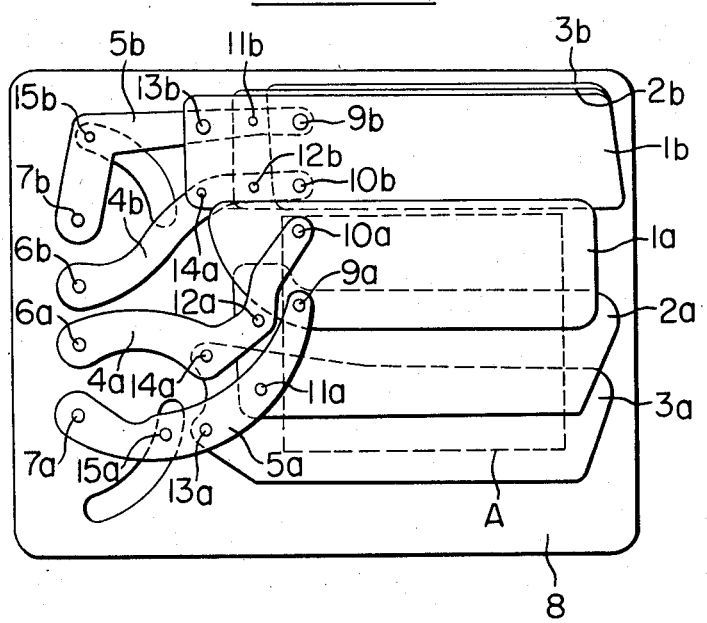
FIG. 1 is a front view of one embodiment of the conventional focal plane shutter.

FIG. 1 shows the focal plane shutter consisting of two sets or groups of shutter blades, each being composed of two arm members having four nodal points and three shutter blades which are linked together in an overlapping manner through these nodal points, by parallel movement of which, in a predetermined sequence, there may be formed a desired slit for exposure. The shutter blades 1a, 2a and 3a arranged sequentially in an overlapping manner constitute the front blade group. Arms 4a and 5a for the shutter opening operation are pivotally fitted on a base plate 8 by means of shafts 6a and 7a, respectively. The shutter blade 1a forms one of the edges of the exposure slit which is pivotally fitted to the blade opening arms 4a amd 5a by means of shafts 9a and 10a. The shutter blade 2a is pivotally fitted onto the blade opening arms 4a and 5a by means of shafts 11a and 12a. The shutter blade 3a is pivotally fitted onto the blade opening arms 4a and 5a by means of shafts 13a and 14a.

In the above-described construction, the front blade group consisting of the blades 1a, 2a and 3a performs parallel movement along one side of an apperture A due to pantographic movement of the blade opening arms 4a and 5a respectively fixed at their one end by the shafts 6a and 7a.

The shutter blades 1b, 2b and 3b constituting the rear blade group are respectively fitted in a pivotal manner to arms 4b, and 5b for the blade closing operation by means of shafts 9b and 10b, 11b and 12b and 13b and 14b, respectively. The shutter blade 1b constitutes the other edge of the slit. These blade closing arms 4b and 5b are pivotally fitted onto the base plate 8 by means of shafts 6b, and 7b. The pivotal fitting relationship between the blade closing arms 4b and 5b and the shutter blades 1b, 2b and 3b constituting the front blade group is just the reversal of the pivotal fitting relationship between the blade opening arms 4a and 5b and the shutter blades 1a, 2a and 3a constituting the front blade group. On account of this, the shutter blades 1b, 2b and 3b in the rear blade group perform parallel movement along one side of the aperture A by the pantographic movement of blade closing arms 4b and 5b pivotally fixed at one end thereof by the shaft 6b and 7b. Pins 15a and 15b function to oscillate the blade opening arm 5a and the blade closing arm 5b upon transmission of driving force from a driving source incorporated in the shutter drive mechanism (not shown in the drawing).

At the time of the shutter charging, the shutter blades of the front blade group in the focal plane shutter constructed in the above-described manner are shaped by the blade opening arm 5a to cover the whole area of the aperture A, while the shutter blades of the rear blade group are kept laminated by the blade closing arm 5b outside the upper edge of the aperture A. At the time of the shutter release, the blade opening arm 5a is rotated clockwise to cause the shutter blades in the front blade group to sequentially retire from the aperture A to be laminated outside the lower edge of the aperture. On the other hand, the blade closing arm 5b also rotates clockwise after lapse of a predetermined shutter timing to spread the shutter blades in the rear blade group from the top edge of the aperture toward the bottom edge thereof to cover the same.

The above-described operations are well known, and no further details will be given.

Figure 2:
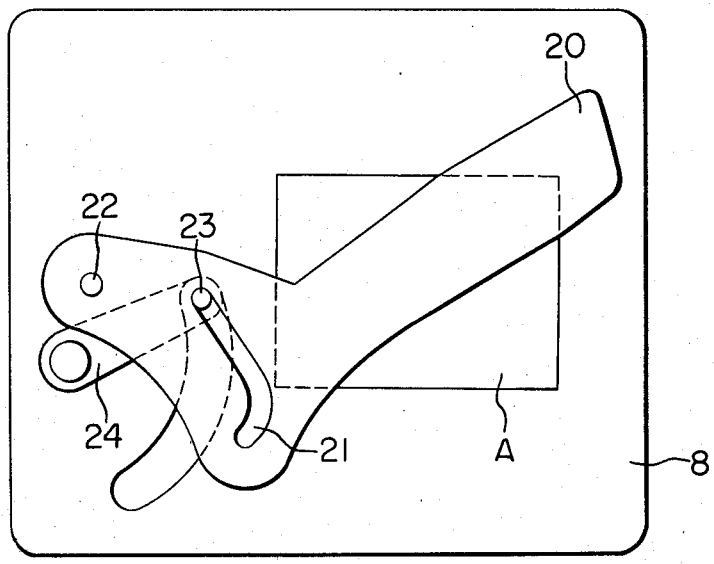
FIG. 2 is also a front view of a part of another embodiment of the focal plane shutter of a known type.

FIG. 2 shows another type of the focal plane shutter, in which only the slit-forming shutter blades in the front and rear blade groups perform the parallel movement by the four nodal links as shown in FIG. 1, and the other shutter blades perform rotational movement. FIG. 2 does not show the shutter blades 1a and 1b as shown in FIG. 1. A cam groove 21 is perforated in a rotary blade 20. The blade is pivotally fitted to the base plate by a shaft 22. The rotary blade 20 rotates by rotation of a crank member 24, a pin 23 of which is fitted in the cam groove to follow the slit-forming shutter blade (not shown). Since this construction and operations are also known conventionally, no further details will be given.

FIG. 3a shows the first embodiment of the present invention, in which thickness of the shutter blade 30 as shown in FIG. 1 is made thin throughout, except for the surrounding area 30a of the pivotal fitting portion where driving force is applied from the drive mechanism, and the edge portion 30b thereof where close contact is necessary with the adjacent shutter blades to prevent leakage of light. In other words, thinning operation is done on the plate material for the shutter blade.

FIG. 3b shows the second embodiment of the shutter blade according to the present invention, which is a rotary blade 31 as shown in FIG. 2. In this embodiment, all the portions of the shutter blade except for the cam groove portion 31a and the edge portion 31b of the blade are made thin.

In order to make the shutter blade thin, only one surface side of the shutter blade may be thinned as shown in FIG. 4a, or both surface sides of the shutter blade may be thinned as shown in FIG. 4b. For the method of thinning the shutter blade, a light intercepting (opaque) thin plate may be welded or soldered onto a frame forming the connecting part of the shutter blade with the drive mechanism and the edge portion thereof. For the light intercepting plate, there may be used steel plate, titanium plate, or polyester film. Also, the shutter blade made of a thick plate material may be etched with chemicals. Further, thick plate material may be partially thinned by a press machine.

For the purpose of maintaining close contact between adjacent shutter blades to prevent light from leaking, the pivotally connected part and the cam groove part of the shutter blade, i.e., the connected part of the blade with the drive mechanism as well as the edge part thereof, are required to be kept at a uniform thickness.

FIG. 5 shows the third embodiment of the shutter blade according to the present invention, wherein the pivotal connection 33a and the surrounding edge are formed by etching or molding of a synthetic resin material. By so doing, the pivotal connection 33a maintains sufficient mechanical strength. Since the pivotal connection can be formed in such a manner that it may rise up perpendicularly from the shutter blade 35, connection between the shutter blade and the blade opening or closing arm 36 with a pin 34 can be done without failure, and play of the pin in the thrusting direction can be maintained constant, whereby a smooth rotation connection can be secured.

According to the above-described embodiments of the present invention, the total weight of the shutter blades in both front and rear blade groups can be reduced, whereby the shock caused at the termination of the shutter blade movement and the load imposed at the shutter charging can be reduced.

Such light weight blade enables higher shutter speed such as, for example, 1/4,000 sec., etc. to be realized.

FIG. 6 is a front view of the fourth embodiment of the shutter blade according to the present invention constituting the front (or rear) blade group. The blade is made of a metal material.

Figure 7:
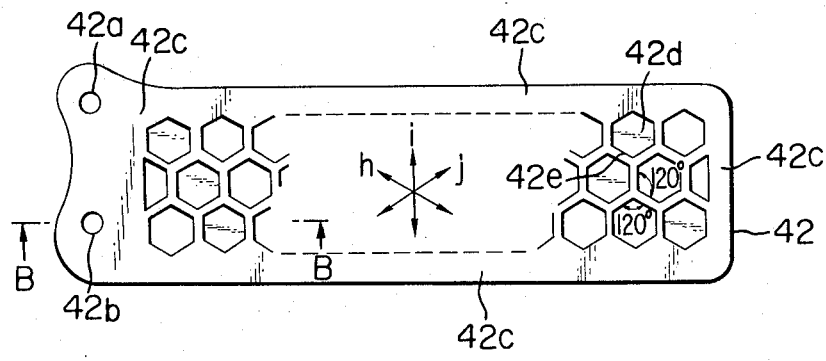
FIG. 7 shows an enlarged front view of the fourth embodiment of the shutter blade in FIG. 6.

FIG. 7 is an enlarged front view of the metal shutter blade shown in FIG. 6.

Figure 8:
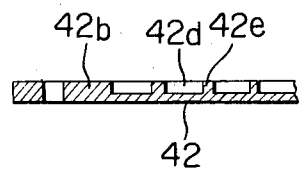
FIG. 8 is a partial view in longitudinal cross-section of the shutter blade shown in FIG. 7 taken along the line B-B.

FIG. 8 is a partial longitudinal cross-sectional view of the shutter blade in FIG. 7 taken along the line B-B.

In FIG. 6, reference numerals 41 and 42 refer to the metal shutter blades constituting the front (or rear) blade group, and numerals 43 and 44 refer to the driving members. One end (43a, 44a) of each of the driving members 43 and 44 is oscillatably held onto the main body of a camera (not shown). The other end part of the driving members oscillatably holds the shutter blades at the connections 41a, 42a, 41b and 42b thereon.

FIG. 6 shows a state prior to release of the shutter blades. At the time of the shutter release, when the driving members 43 and 44 are rotated by the drive mechanism (not shown) with one end of the driving members 43a and 44a as the center of rotation, the shutter blades 41 and 42 travel in the direction of an arrow A. Each of the shutter blades has a multitude of right, i.e., regular, hexagonal recesses 42d which are independently and separately defined by surrounding ribs 42e connected together at a plurality of connection points. Accordingly, these recesses are mutually separated by these raised surrounding edges, or thick ribs, 42e having the same thickness as that of the connecting part 42b (vide FIG. 8). Each of the ribs is mutually connected with adjacent ribs and ultimately joined with the outer edge defining the shutter blade. The recesses 42d should preferably be arranged densely to fill the entire surface of the blade as shown in FIG. 6. These recesses may be formed by the photo-etching method. The connecting parts 41a, 41b, 42a and 42b are provided at the outer edge portion 42c of the blade.

Figure 9:
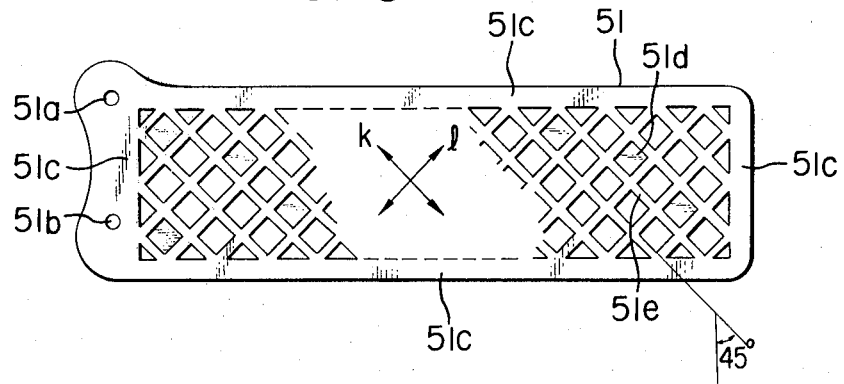
FIG. 9 shows a fifth embodiment of the shutter blade according to the present invention.

FIG. 9 shows the fifth embodiment of the shutter blade according to the present invention, in which the shutter blade 51 has the outer edge portion 51c as in the fourth embodiment in FIG. 6. In this embodiment, separate and independent square recesses 51d are formed in the portion enclosed by the surrounding edges 51c. These recesses are also mutually partitioned by the ribs 51e and densely arranged within the whole blade area enclosed by the outer edge 51c. The connecting parts 51a and 51b are provided on this outer peripheral edge portion 51c.

Figure 10:
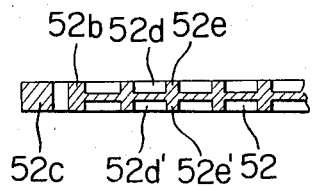
FIG. 10 is a partial view in longitudinal cross-section, in which the plate material for the blade is shown to be thinned from both surface sides.

FIG. 10 is a partial longitudinal cross-sectional view of the sixth embodiment of the shutter blade according to the present invention, in which the recesses 52d are formed in both surfaces of the shutter blade 52. The recesses 52d, the ribs 52e and the connecting part 52b are constructed in the same manner as those in the fourth and fifth embodiments, and the recesses 52d' and the ribs 52e' are constructed in the same manner as in the recesses 52d and the ribs 52e with the exception that they are formed on the surface opposite to the former.

According to the fourth, fifth and sixth embodiments of the present invention, a multitude of independent and discrete recesses are provided on the shutter blade at the portions enclosed by the outer peripheral edge portions, whereby weight reduction in the shutter blade can be achieved, while decrease in the mechanical strength of the shutter blade can be prevented by the ribs defining the recesses. Important here with respect to the ribs for maintaining the blade stength is that these surrounding ribs are not disconnected on the way, i.e., they are continuous in all directions and ultimately connected to the outer peripheral edge portion of the blade.

Formation of the recesses in the right hexagonal or square shape as in each embodiment makes it possible to arrange them with high density, whereby the thinning operation can be done more easily than in the case of thinning the blade with the recesses in other shapes. The right triangular shape may be other example of the right polygons.

Since the shutter blade in each embodiment is particularly excellent in its mechanical strength in the direction where the ribs are extending, it is better to select the shape of the recesses in such a manner that the extending direction of the ribs may coincide with the direction of large impact forces to be imparted by inertial action to every part of the shutter blade at the start and stop of the shutter blade. For example, in the case of the fourth embodiment, since the ribs extend in the three directions of h, i, and j with an angle of 120 degrees among them, the ribs have excellent mechanical strength along these three directions. In the case of the fifth embodiment, the ribs are formed in two directions of k and l which are at 90 degrees hence the mechanical strength is excellent in these two directions. An advantage of forming the recesses in the right polygonal shape is that the extending direction of the ribs can be easily aligned in a plurality of particular directions.

Generally speaking, when the plate thickness is thinned, the shutter blade tends to warp in a substantially perpendicular direction to the surface of the blade. Since, in the fourth embodiment, however, the ribs extend in three directions at 120 degrees of an angle, the possibility of warping is less than that in the fifth embodiment. In other words, since, in the fourth embodiment, the ribs extend in relatively many directions in a zig-zag pattern, the angle formed by the adjacent ribs is equal, the possibility of warping of the blade is less than in the fifth embodiment. The same holds true with the recesses having a right triangular shape which extend along first and second lines in different directions. As a consequence, flatness of the shutter blade can be maintained, and there is no increase in friction between the blade and the guide, or between the shutter blades when the shutter blades run.

Lastly, when a multitude of recesses are formed in both surfaces of the shutter blade as shown in FIG. 10, the possibility of warping is much less than in the case of forming the recesses only in one surface side of the blade. Therefore, formation of the recesses in both surfaces of the shutter blade is highly advantageous in maintaining flatness of the shutter blade and reducing running friction between the shutter blades, or between the shutter blade and the guide as mentioned above.

Thus, according to the present invention, the shutter blade can be made light in weight, and a sufficiently high mechanical strength maintained.

We claim:

1. A shutter blade for a focal plane shutter comprising an opaque plate adapted to move across a film exposure aperture, the plate having a connecting portion adapted to connect the blade to a drive mechanism, having an outer peripheral edge portion contiguous with the connecting portion, the outer peripheral edge portion circumscribing the edge of the plate and defining the outer boundary thereof, and having an interior portion within the peripheral edge portion, the interior portion including a plurality of recesses greater than two of a regular polygonal shape, each recess being of the same size and shape, and a plurality of ribs connected together and to the peripheral edge portion, adjacent recesses being separated by one of said ribs and being symmetrically disposed with respect to said one rib, the connecting portion and the peripheral edge portion defining areas of the shutter blade having greater thickness than the areas of said recesses, which recess areas do not penetrate the thickness of the plate, and wherein the connecting portion, the peripheral edge portion, and the ribs are arranged to carry mechanical stresses applied to the blade and to relieve the recesses of mechanical stresses.

2. A shutter blade in accordance with claim 1, wherein the plurality of ribs includes ribs arranged to extend in a direction in which impact forces caused by inertia are exerted on the blade.

3. A shutter blade in accordance with claim 1, wherein the recesses are formed on opposite surfaces of the plate.

4. A shutter blade in accordance with claim 1, wherein the recesses are of a regular hexagonal shape.

5. A shutter blade in accordance with claim 1, wherein the recesses are of a square shape.

6. A shutter blade in accordance with claim 1, wherein the thickness of the connecting portion and the outer peripheral edge portion is uniform.

7. A shutter blade for a focal plane shutter comprising an opaque plate adapted to move across a film exposure aperture, the plate having a connecting portion adapted to connect the blade to a drive mechanism, an interior portion comprising a plurality of interconnected ribs defining a plurality of more than two recesses, which recesses do not penetrate the plate, each recess being the same size and having the same regular polygonal shape and adjacent recesses being arranged symmetrically with respect to one of said ribs, and a peripheral portion surrounding and defining said interior portion, the connecting portion, the ribs and the peripheral portion being contiguous and defining areas of the shutter blade having greater thickness than the areas of said recesses and being arranged to carry mechanical stresses applied to the blade and to relieve the recesses of mechanical stresses.

8. A shutter blade for a focal plane shutter comprising an opaque plate adapted to move across a film exposure aperture, the plate having a connecting portion adapted to connect the blade to a drive mechanism, having an outer peripheral edge portion contiguous with the connecting portion, the outer peripheral edge portion circumscribing the edge of the plate and defining the outer boundary thereof, and having an interior portion within the peripheral edge portion, the interior portion including a plurality of recesses greater than two, and a plurality of ribs connected together and to the peripherial edge portion, adjacent recesses being separated by one of said ribs, the connecting portion and the peripheral edge portion defining areas of the shutter blade having greater thickness than the areas of said recesses, which recess areas do not penetrate the thickness of the plate, and wherein the connecting portion, the peripheral edge portion, and the ribs are arranged to carry mechanical stresses applied to the blade and to relieve the recesses of mechanical stresses.

9. A shutter blade in accordance with claim 8, wherein said plurality of ribs are connected together at a plurality of connection points within said interior portion, and the ribs that are connected together at each connection point extend from the connection point in different directions.

10. A shutter blade in accordance with claim 9, wherein each rib extending from said connection points extends in one of three predetermined directions.

11. A shutter blade in accordance with claim 9, wherein the ribs extending from a connection point are arranged at an angle of 120 degrees with respect to one another.

12. A shutter blade in accordance with claim 8, wherein the plurality of recesses comprise first and second groups of recesses, the recesses of each group being arranged such that they extend along one of first or second lines.

13. A shutter blade in accordance with claim 8, wherein the plurality of ribs are connected together to form a zig-zag pattern.

14. A shutter blade for a focal plane shutter comprising an opaque plate adapted to move across a film exposure aperture, the plate having a connecting portion adapted to connect the blade to a drive mechanism, an interior portion comprising a plurality of interconnected ribs defining a plurality of more than two recesses, which recesses do not penetrate the plate, and a peripheral portion surrounding and defining said interior portion, the connecting portion, the ribs and the peripheral portion being contiguous and defining areas of the shutter blade having greater thickness than the areas of said recesses and being arranged to carry mechanical stresses applied to the blade and to relieve the recesses of mechanical stresses.

* * * * *